United States Patent
Zhang et al.

(10) Patent No.: US 11,947,156 B2
(45) Date of Patent: Apr. 2, 2024

(54) DISPLAY PANEL AND ELECTRONIC DEVICE

(71) Applicant: WUHAN CHINA STAR OPTOELECTRONICS TECHNOLOGY CO., LTD., Hubei (CN)

(72) Inventors: Peng Zhang, Hubei (CN); Chao Wang, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 17/611,491

(22) PCT Filed: Sep. 26, 2021

(86) PCT No.: PCT/CN2021/120537
§ 371 (c)(1),
(2) Date: Mar. 23, 2023

(87) PCT Pub. No.: WO2023/039929
PCT Pub. Date: Mar. 23, 2023

(65) Prior Publication Data
US 2024/0045134 A1  Feb. 8, 2024

(30) Foreign Application Priority Data
Sep. 17, 2021 (CN) .......................... 202111092772.9

(51) Int. Cl.
*F21V 8/00* (2006.01)
*G02F 1/1334* (2006.01)

(52) U.S. Cl.
CPC .......... *G02B 6/008* (2013.01); *G02F 1/1334* (2013.01)

(58) Field of Classification Search
CPC ............................. G02B 6/008; G02F 1/1334
See application file for complete search history.

(56) References Cited

U.S. PATENT DOCUMENTS

2020/0186688 A1* 6/2020 Chen ..................... H04N 23/54
2021/0263375 A1* 8/2021 Hasegawa ............... F21V 23/00

FOREIGN PATENT DOCUMENTS

| CN | 107784989 A | 3/2018 |
| CN | 108469704 A | 8/2018 |

(Continued)

OTHER PUBLICATIONS

Chinese Office Action issued in corresponding Chinese Patent Application No. 202111092772.9 dated Apr. 14, 2022, pp. 1-8.

(Continued)

*Primary Examiner* — Donald L Raleigh
(74) *Attorney, Agent, or Firm* — PV IP PC; Wei Te Chung; Zhigang Ma

(57) ABSTRACT

The present application provides a display panel and an electronic device. A first sub-backlight module is arranged in a display area of the display panel, and a second sub-backlight module is arranged in an electronic component area. A light guide plate of the second sub-backlight module can be switched between a light-scattering state and a transparent state, so that the electronic component area can display images and take photos. The first light-shielding member is arranged in an accommodating space defined by the display panel body and the backlight module to avoid light leakage during shooting, so that full-screen display can be realized without light leakage.

20 Claims, 7 Drawing Sheets

(56) References Cited

FOREIGN PATENT DOCUMENTS

| CN | 109709711 | A | | 5/2019 | |
|---|---|---|---|---|---|
| CN | 109856850 | A | | 6/2019 | |
| CN | 110441947 | A | | 11/2019 | |
| CN | 110471211 | A | | 11/2019 | |
| CN | 209911705 | U | | 1/2020 | |
| CN | 110888261 | A | | 3/2020 | |
| CN | 210605285 | U | | 5/2020 | |
| CN | 210605287 | U | | 5/2020 | |
| CN | 210894768 | U | | 6/2020 | |
| CN | 111708196 | A | | 9/2020 | |
| CN | 112866460 | A | | 5/2021 | |
| CN | 112987398 | A | | 6/2021 | |
| CN | 112987398 | A | * | 6/2021 | ........... G02F 1/1323 |
| CN | 113176682 | A | | 7/2021 | |
| CN | 113376901 | A | | 9/2021 | |
| JP | 2013055057 | A | | 3/2013 | |
| JP | 2020148942 | A | | 9/2020 | |
| WO | 2018196149 | A1 | | 11/2018 | |

OTHER PUBLICATIONS

International Search Report in International application No. PCT/CN2021/120537, dated Jun. 17, 2022.
Written Opinion of the International Searching Authority in International application No. PCT/CN2021/120537, dated Jun. 17, 2022.
Notification to Grant Patent Right for Invention issued in corresponding Chinese Patent Application No. 202111092772.9 dated May 10, 2022, pp. 1-4.

* cited by examiner

DISPLAY PANEL AND ELECTRONIC DEVICE

RELATED APPLICATIONS

This application is a Notional Phase of PCT Patent Application No. PCT/CN2021/120537 having international filing date Sep. 26, 2021, which claims the benefit of priority of Chinese Patent Application No. 202111092772.9 filed on Sep. 17, 2021. The contents of the above applications are all incorporated by reference as if fully set forth herein in their entirety.

FIELD OF DISCLOSURE

The present application relates to a field of display technology and in particular, to a display panel and an electronic device.

DESCRIPTION OF RELATED ART

With the development of full-screen display technology, under-screen camera solutions are widely used in full-screen display panels. In conventional under-screen camera solutions, an opening area is defined in a backlight module to place a camera module, and a sealant frame is disposed surrounding the opening area to prevent light leakage. However, in this way, the opening area can only be used as a channel for transmitting and receiving ambient light for the camera module, and the sealant frame can only prevent light leakage. In addition to that, in the opening area and an area of the sealant frame, the backlight module cannot provide light to a display panel body disposed above the backlight module, so the display panel body above the opening area and the area of the sealant frame cannot display images when a camera is not in operation, which seriously affects full-screen display effects.

Therefore, there is a need to solve a problem that conventional under-screen camera display panels cannot provide full-screen display.

SUMMARY

The present application provides a display panel and an electronic device to solve a technical problem that conventional display panel with under-screen cameras cannot achieve full-screen display.

To solve the above problem, the present application provides solutions as follows.

The present application provides a display panel, comprising an electronic component area and a display area surrounding the electronic component area, wherein the display panel further comprises:

a display panel body;

a backlight module arranged on one side of the display panel body, wherein the backlight module sequentially comprises a first sub-backlight module and a second sub-backlight module in a first direction away from the display panel body, the first sub-backlight module is arranged corresponding to the display area, the second sub-backlight module covers the electronic component area, the second sub-backlight module comprises a second backlight source and a second light guide plate, and the second light guide plate comprises a transparent state and a light-scattering state and is configured to be switched between the transparent state and the light-scattering state; and a first light-shielding member arranged in an accommodating space enclosed by the display panel body, the first sub-backlight module, and the second sub-backlight module, wherein the first light-shielding member comprises a first light-transmissive portion and a first light-shielding portion; the first light-transmissive portion comprises a first light-incident surface, a first light-emergent surface arranged opposite to the first light-incident surface, and a first outer side surface connecting the first light-incident surface and the first light-emergent surface; the first light-incident surface is arranged corresponding to a light-emergent surface of the second light guide plate; the first light-emergent surface is arranged corresponding to a light-incident surface of the display panel body; and the first light-shielding portion covers the first outer side surface.

In one embodiment, the display area comprises a first display area surrounding the electronic component area and a second display area surrounding the first display area; the backlight module further comprises a third sub-backlight module arranged between the first sub-backlight module and the second sub-backlight module; the first sub-backlight module comprises a first light guide plate, and the third sub-backlight module comprises a third light guide plate; and the first light guide plate covers the second display area and comprises an opening defined corresponding to the first display area and the electronic component area, and the third light guide plate covers the first display area and comprises an opening defined corresponding to the electronic component area.

In one embodiment, any adjacent two of the first light guide plate, the second light guide plate, and the third light guide plate have an overlapped portion.

In one embodiment, the display panel further comprises a second light-shielding member, the second light-shielding member is located in the opening of the first light guide plate and engaged outside the first light-shielding portion; the second light-shielding member comprises a second light-transmissive portion and a second light-shielding portion; the second light-transmissive portion comprises a second light-incident surface, a second light-emergent surface arranged opposite to the second light-incident surface, and an inner side surface and a second outer side surface connected to the second light-incident surface and the second light-emergent surface; the second light-incident surface is arranged corresponding to the light-emergent surface of the third light guide plate, and the second light-emergent surface is arranged corresponding to the light-incident surface of the display panel body; the inner side surface is disposed close to the first light-shielding portion, and the second outer side surface is disposed away from the first light-shielding portion; and the second light-shielding portion covers at least one of the inner side surface or the second outer side surface.

In one embodiment, the backlight module comprises a first backplate, a third backplate, and a second backplate sequentially arranged in the first direction; the first to the third sub-backlight modules are installed on the first to the third backplates, respectively; the third sub-backlight module is connected between the first backplate and the third backplate; and the second sub-backlight module is connected between the third backplate and the second backplate.

In one embodiment, the backlight module comprises a first backplate and a second backplate sequentially arranged in the first direction, adjacent two of the first to the third sub-backlight modules are installed on one of the first backplate and the second backplate, and the remaining one of the first to the third sub-backlight modules is installed on the other one of the first backplate and the second backplate.

In one embodiment, the first sub-backlight module is installed on the first backplate, the second sub-backlight module is installed in an accommodating space of the second backplate, and the third sub-backlight module is located in the accommodating space of the second backplate and connected to one side of the first backplate away from the first sub-backlight module.

In one embodiment, the third sub-backlight module is installed on the first backplate, the first sub-backlight module is installed in an accommodating space of the first backplate, and the second sub-backlight module is installed in an accommodating space of the second backplate and connected to one side of the first backplate away from the third sub-backlight module.

In one embodiment, the second light guide plate comprises a first electrode, a second electrode, and a polymer-dispersed liquid crystal layer disposed between the first electrode and the second electrode.

In one embodiment, the display panel further comprises a control unit and a plurality of electronic components; the electronic components are arranged on one side of the second sub-backlight module away from the display panel body and located in the electronic component area; when the display panel body displays images, the control unit is configured to control the second backlight source to emit light, and to control the second light guide plate to be in the light-scattering state to transmit light from the second backlight source to the display panel body; and when the electronic components are in operation, the control unit is configured to control the second backlight source not to emit light, and to control the second light guide plate to be in the transparent state to transmit ambient light to the electronic components.

The present application further provides an electronic device, comprising a display panel with an electronic component area and a display area surrounding the electronic component area, wherein the display panel comprises:
  a display panel body;
  a backlight module arranged on one side of the display panel body, wherein the backlight module sequentially comprises a first sub-backlight module and a second sub-backlight module in a first direction away from the display panel body, the first sub-backlight module is arranged corresponding to the display area, the second sub-backlight module covers the electronic component area, the second sub-backlight module comprises a second backlight source and a second light guide plate, and the second light guide plate comprises a transparent state and a light-scattering state and is configured to be switched between the transparent state and the light-scattering state; and
  a first light-shielding member arranged in an accommodating space enclosed by the display panel body, the first sub-backlight module, and the second sub-backlight module, wherein the first light-shielding member comprises a first light-transmissive portion and a first light-shielding portion; the first light-transmissive portion comprises a first light-incident surface, a first light-emergent surface arranged opposite to the first light-incident surface, and a first outer side surface connecting the first light-incident surface and the first light-emergent surface; the first light-incident surface is arranged corresponding to a light-emergent surface of the second light guide plate; the first light-emergent surface is arranged corresponding to a light-incident surface of the display panel body; and the first light-shielding portion covers the first outer side surface.

In one embodiment, the display area comprises a first display area surrounding the electronic component area and a second display area surrounding the first display area; the backlight module further comprises a third sub-backlight module arranged between the first sub-backlight module and the second sub-backlight module; the first sub-backlight module comprises a first light guide plate, and the third sub-backlight module comprises a third light guide plate; and the first light guide plate covers the second display area and comprises an opening defined corresponding to the first display area and the electronic component area, and the third light guide plate covers the first display area and comprises an opening defined corresponding to the electronic component area.

In one embodiment, any adjacent two of the first light guide plate, the second light guide plate, and the third light guide plate have an overlapped portion.

In one embodiment, the display panel further comprises a second light-shielding member, the second light-shielding member is located in the opening of the first light guide plate and engaged outside the first light-shielding portion; the second light-shielding member comprises a second light-transmissive portion and a second light-shielding portion; the second light-transmissive portion comprises a second light-incident surface, a second light-emergent surface arranged opposite to the second light-incident surface, and an inner side surface and a second outer side surface connected to the second light-incident surface and the second light-emergent surface; the second light-incident surface is arranged corresponding to the light-emergent surface of the third light guide plate, and the second light-emergent surface is arranged corresponding to the light-incident surface of the display panel body; the inner side surface is disposed close to the first light-shielding portion, and the second outer side surface is disposed away from the first light-shielding portion; and the second light-shielding portion covers at least one of the inner side surface or the second outer side surface.

In one embodiment, the backlight module comprises a first backplate, a third backplate, and a second backplate sequentially arranged in the first direction; the first to the third sub-backlight modules are installed on the first to the third backplates, respectively; the third sub-backlight module is connected between the first backplate and the third backplate; and the second sub-backlight module is connected between the third backplate and the second backplate.

In one embodiment, the backlight module comprises a first backplate and a second backplate sequentially arranged in the first direction, adjacent two of the first to the third sub-backlight modules are installed on one of the first backplate and the second backplate, and the remaining one of the first to the third sub-backlight modules is installed on the other one of the first backplate and the second backplate.

In one embodiment, the first sub-backlight module is installed on the first backplate, the second sub-backlight module is installed in an accommodating space of the second backplate, and the third sub-backlight module is located in the accommodating space of the second backplate and connected to one side of the first backplate away from the first sub-backlight module.

In one embodiment, the third sub-backlight module is installed on the first backplate, the first sub-backlight module is installed in an accommodating space of the first backplate, and the second sub-backlight module is installed in the accommodating space of the second backplate and connected to one side of the first backplate away from the third sub-backlight module.

In one embodiment, the second light guide plate comprises a first electrode, a second electrode, and a polymer-dispersed liquid crystal layer disposed between the first electrode and the second electrode.

In one embodiment, the display panel further comprises a control unit and a plurality of electronic components; the electronic components are arranged on one side of the second sub-backlight module away from the display panel body and located in the electronic component area; when the display panel body displays images, the control unit is configured to control the second backlight source to emit light, and to control the second light guide plate to be in the light-scattering state to transmit light from the second backlight source to the display panel body; and when the electronic components are in operation, the control unit is configured to control the second backlight source not to emit light, and to control the second light guide plate to be in the transparent state to transmit ambient light to the electronic components.

Advantages of the Present Application

The present application provides the display panel and the electronic device. The display panel comprises the electronic component area and the display area surrounding the electronic component area. The first sub-backlight module is disposed corresponding to the display area, and the second sub-backlight module is disposed corresponding to the electronic component area. Since the light guide plate of the second sub-backlight module can be switched between the light-scattering state and the transparent state, the display panel body in the electronic component area can display images and take photos/videos through light of the backlight source or ambient light. Furthermore, the first light-shielding member is arranged in the accommodating space defined by the display panel body and the backlight module. As a result, the present application not only can allow transmission of the ambient light or the light of the backlight source, but also prevent the light of the first sub-backlight module from entering the electronic component area to avoid light leakage during shooting. Therefore, the display panel of the present application realizes full-screen display and at the same time, also ensures no light leakage.

DETAILED DESCRIPTION OF EMBODIMENTS

The technical solutions in the present application will be clearly and completely described below in conjunction with the accompanying drawings and in conjunction with specific embodiments. Obviously, the described embodiments are only some of the embodiments of the present application, rather than all the embodiments. Based on the embodiments in the present application, all other embodiments obtained by those skilled in the art without creative work shall be deemed to fall within the protection scope of the present application.

Figure 1:
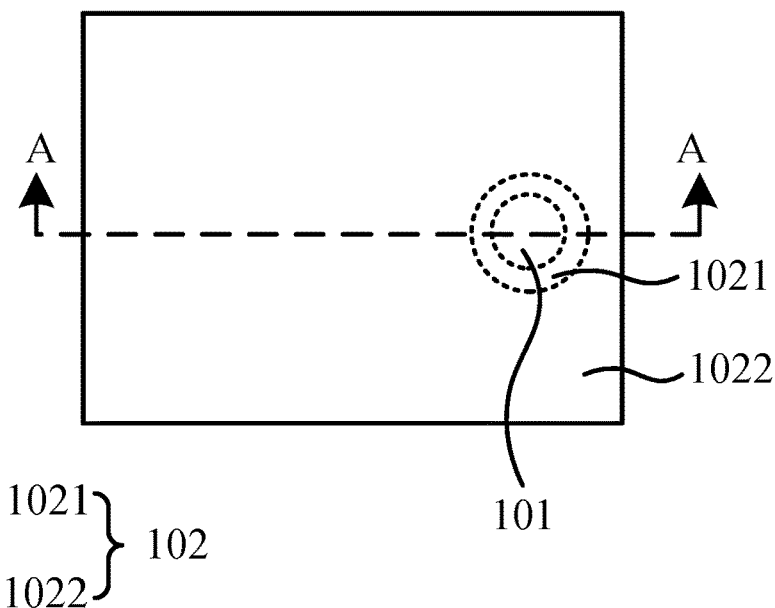
FIG. 1 is a schematic planar structural view illustrating a display panel according to one embodiment of the present application.
Figure 2:
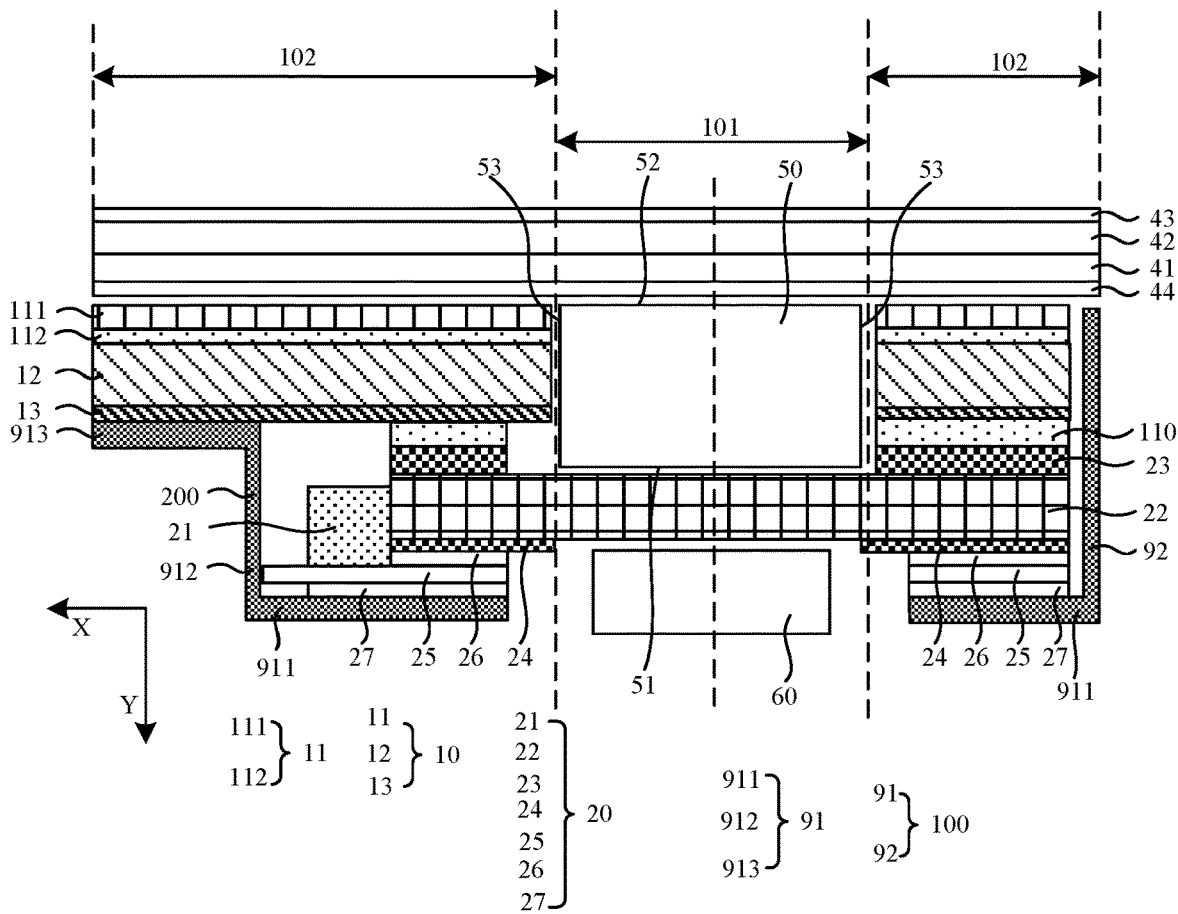
FIG. 2 is a first cross-sectional structural view, taken along an A-A direction in FIG. 1, illustrating the display panel.

As shown in FIG. 1 and FIG. 2, the present application provides a display panel. The display panel comprises an electronic component area 101 and a display area 102 surrounding the electronic component area 101. The electronic component area 101 usually has a circular shape but can also have other shapes, and the present application is not limited in this regard. For ease of illustration, the display area 102 on a left side of the electronic component area 101 in FIG. 2 is only partially shown.

As shown in FIG. 2, the display panel comprises a display panel body, a backlight module, a first light-shielding member 50, and a plurality of electronic components 60.

The display panel body comprises an array substrate 41 and a color filter substrate 42 arranged opposite to each other, and a liquid crystal layer (not illustrated) arranged between the array substrate 41 and the color filter substrate 42. Furthermore, the display panel body further comprises a first polarizer 43 disposed on one side of the color filter substrate 42 away from the array substrate 41 and a second polarizer 44 disposed on one side of the array substrate 41 away from the color filter substrate 42. It should be noted that FIG. 2 only shows one type of display panel body, but the present application is not limited in this regard. For example, the display panel body can also be a COA (color filter on array) display panel body. The display panel is a liquid crystal display panel.

The backlight module is arranged on one side of the display panel body. The display panel body comprises a light-emergent side and a light-incident side. The backlight module is disposed on the light-incident side of the display panel body to provide backlight for the display panel body, so that the display panel body can display images. In FIG. 2, an upper side of the first polarizer 43 is the light-emergent side, and a lower side of the second polarizer 44 is the light-incident side. In a first direction Y away from the display panel body, the backlight module sequentially comprises a first sub-backlight module 10 and a second sub-backlight module 20. The first sub-backlight module 10 is arranged corresponding to the display area 102, and the second sub-backlight module 20 covers the electronic component area 101. The second sub-backlight module 20 comprises a second backlight source 21 and a second light guide plate 22. The second light guide plate 22 has a transparent state and a light-scattering state to be switched between the transparent state and the light-scattering state.

In the first direction Y away from the display panel body, the first sub-backlight module 10 sequentially comprises a first optical film 11, a first light guide plate 12, and a first reflective sheet 13. The first optical film 11 comprises a prism sheet 111 and a light diffusion sheet 112. In addition, the first sub-backlight module 10 further comprises a first backlight source (not illustrated). In the embodiment of the present application, the first sub-backlight module 10 is an edge-lit backlight structure, and the first backlight source is arranged on a side of the display panel and corresponding to a light-incident surface of the first light guide plate 12. Light of the first backlight source enters the first light guide plate 12, exits through a light-emergent surface of the first light guide plate 12, passes through the first optical film 11, and then enters the display panel body to provide backlight to the display panel body in the display area 102, so that the display area 102 can display images. The light-emergent surface of the first light guide plate 12 is perpendicular to the first direction Y. In FIG. 2, an upper surface of the first light guide plate 12 close to the display panel body is the light-emergent surface of the first light guide plate 12.

In one embodiment, a material of the first light guide plate 12 is polycarbon fiber.

The second sub-backlight module 20 comprises the second backlight source 21 and the second light guide plate 22. The second sub-backlight module 20 is also an edge-lit backlight structure. The second backlight source 21 is arranged on a side of the display panel and corresponding to a light-incident surface of the second light guide plate 22. A light-emergent surface of the second light guide plate 22 is perpendicular to the first direction Y and faces the display panel body.

The second light guide plate 22 is a polymer-dispersed liquid crystal light modulating film, which comprises a first electrode, a second electrode, and a polymer-dispersed liquid crystal layer located between the first electrode and the second electrode. A polymer-dispersed liquid crystal material is a mixture of low molecular weight liquid crystals (liquid crystal molecules) and prepolymer. The mixture undergoes polymerization under certain conditions to form micron-sized liquid crystal particles uniformly dispersed in a polymer network, and then a material with electro-optical response characteristics is obtained through dielectric anisotropy of the liquid crystal molecules.

When no voltage is applied between the first electrode and the second electrode, optical axes of the liquid crystal particles in the polymer-dispersed liquid crystal layer are randomly oriented, showing an orientationally disordered state. An effective refractive index of the liquid crystal particles does not match a refractive index of the polymer, causing light incident from the second backlight source 21 to be strongly scattered. At this point, the polymer-dispersed liquid crystal layer is in the light-scattering state. After light incident from the side enters the polymer-dispersed liquid crystal layer, a light propagation direction changes due to a light-scattering effect of the polymer-dispersed liquid crystal layer. Eventually, the light exits from the light-emergent surface of the second light guide plate 22 to provide uniform backlight to the display panel body in the electronic component area 101.

When a voltage is applied between the first electrode and the second electrode, the optical axes of the liquid crystal particles in the polymer-dispersed liquid crystal layer are consistent with a direction of an electric field, and the effective refractive index of the liquid crystal particles basically matches the refractive index of the polymer, so there is no obvious interface, and a basically uniform medium is formed. At this point, the polymer-dispersed liquid crystal layer is in the transparent state and can transmit ambient light from top to bottom.

The second sub-backlight module 20 further comprises a second reflective sheet 23 disposed on one side of the second light guide plate 22 close to the first sub-backlight module 10 and a third reflection sheet 24 disposed on one side of the second light guide plate 22 away from the first sub-backlight module 10. The second reflection sheet 23 and the third reflection sheet 24 form an opening corresponding to the electronic component area 101. That is to say, no reflection sheets are disposed in the electronic component area 101, so that the ambient light can smoothly pass through the second light guide plate 22 and enters the electronic components. At the same time, the second reflective sheet 23 and the third reflective sheet 24 arranged around the electronic component area 101 can reflect as much light as possible from the second backlight source 21 into the electronic component area 101, thus improving backlight and display performance of the electronic component area 101. The second sub-backlight module 20 also comprises a first flexible circuit board 25 that is electrically connected to the second backlight source 21. Upper and lower sides of the first flexible circuit board 25 are fixed to other film layers or structures through a first adhesive layer 26 and a second adhesive layer 27, respectively.

The first light-shielding member 50 is disposed in an accommodating space enclosed by the display panel body, the first sub-backlight module 10, and the second sub-backlight module 20. The first light-shielding member 50 comprises a first light-transmissive portion and a first light-shielding portion. The first light-transmissive portion comprises a first light-incident surface 51, a first light-emergent surface 52 arranged opposite to the first light-incident surface 51, and a first outer side surface 53 connecting the first light-incident surface 51 and the first light-emergent surface 52. The first light-incident surface 51 is arranged corresponding to the light-emergent surface of the second light guide plate 22. The first light-emergent surface 52 is arranged corresponding to a light-incident surface of the display panel body. The first light-shielding portion covers the first outer side surface 53. In the present application, the electronic component area is circular as an example. Then, the first light-shielding member 50 is a cylindrical-shaped cylinder, a bottom surface of the cylinder is the first light-incident surface 51, a top surface of the cylinder is the first light-emergent surface 52, and a side of the cylinder is the first outer side surface 53. When the second light guide plate 22 is in the light-scattering state, the light from the second backlight source 21 can be transmitted to enter the first light-transmissive portion from the first light-incident surface 51. Then, the light can be emitted from the first light-emergent surface 52 to provide uniform backlight to the display panel body in the electronic component area 101. The first light-shielding portion covers the first outer side surface 53. That is, an entire side surface of the cylinder is covered with the first light-shielding portion. When the first backlight source emits light, the first light-shielding portion can prevent the light of the display area 102 from entering the electronic component area 101. At the same time, the ambient light in the electronic component area 101 can be prevented from entering the display area 102 to cause interference to the display area 102. In other words, the first light-shielding portion prevents light leakage.

The electronic components 60 are arranged on one side of the second sub-backlight module 20 away from the display panel body, and located in the electronic component area 101. In the present application, the plurality of electronic components are a camera.

When the display panel body needs to display images, the first backlight source emits light, the first light guide plate 12 provides backlight to the entire display area 102, and the second backlight source 22 also emits light. Moreover, no voltage is applied between the first electrode and the second electrode, so that the second light guide plate 22 is in the light-scattering state to provide backlight to the electronic component area 101, so that the display panel body emits light in both the display area 102 and the electronic component area 101, thus realizing full-screen display.

When the electronic component is in operation, that is, when shooting is required, the first backlight source emits light, and the backlight is provided to the entire display area 102 through the first light guide plate 12. Furthermore, the voltage is applied between the first electrode and the second electrode of the second light guide plate 22 to make the second light guide plate 22 be in the transparent state. The ambient light from an outside of the display panel body can enter the first light-transmissive portion from the first light-emergent surface 52 of the first light-shielding member 50, and then be emitted out of the first light-transmissive portion from the first light-incident surface 51. The emitted light finally reaches the electronic components 60, so that the electronic components 60 can gather light for shooting. At the same time, the second backlight source 22 does not emit light, thus preventing the light emitted by the second backlight source 21 from causing interference with the ambient light incident into the second light guide plate 22.

It can be known from the foregoing that the display panel of the present application is provided with a first sub-backlight module disposed corresponding to the display area and a second sub-backlight module disposed corresponding to the electronic component area. Since the light guide plate of the second sub-backlight module can be switched between the light-scattering state and the transparent state, the display panel body in the electronic component area can display images and take photos/videos through the light of the backlight source or the ambient light. Furthermore, the first light-shielding member is arranged in the accommodating space defined by the display panel body and the backlight module. As a result, the present application not only can allow transmission of the ambient light or the light of the backlight source, but also prevent the light of the first sub-backlight module from entering the electronic component area to avoid light leakage during shooting. Therefore, the display panel of the present application realizes full-screen display while ensuring no light leakage.

In one embodiment, the first light-incident surface 51 is in contact with the light-emergent surface of the second light guide plate 22, and the first light-emergent surface 52 is in contact with the light-incident surface of the display panel body. In other words, a height of the cylindrical-shaped first light-shielding member 50 is equal to a height between a lower surface of the display panel body and an upper surface of the second light guide plate 22. Such configuration prevents the first light-shielding member 50 from shaking/wobbling in the first direction Y in the accommodating space to thereby affect light transmission. That is to say, the display panel body and the second light guide plate 22 limit the first light-shielding member 50 in a vertical direction. In practical manufacturing processes, a gap of no more than 0.02 mm can be reserved between two components.

In one embodiment, the first light guide plate 12 and the first optical film 11 form an opening corresponding to the electronic component area 101, and the first outer side surface 53 is in contact with an inner surface of the opening. A shape and a size of the opening are same as a shape and a size of the electronic component area 101. The first outer side surface 53 of the first light-shielding member 50 is in contact with the inner surface of the opening. That is to say, a diameter of the cylindrical-shaped first light-shielding member 50 is same as a diameter of the electronic component area 101. Such configuration can prevent the first light-shielding member from shaking/wobbling in a second direction X perpendicular to the first direction Y in the accommodating space to affect light-shielding. In other words, the first light guide plate 12 and the first optical film 11 restrain movement of the first light-shielding member 50 in the horizontal direction. In practical manufacturing processes, a gap of no more than 0.02 mm can be reserved between two components.

By restraining movement horizontally and vertically as mentioned above, the first light-shielding member 50 can be stably installed in the accommodating space without resorting to other means, thus providing better light-transmission effects and light-shielding effects.

In one embodiment, the backlight module comprises a first backplate 100. The first backplate 100 comprises a first bottom plate 91 and a first side plate 92 that are connected to each other. The first bottom plate 91 and the first side plate 92 form an accommodating space. A through hole is defined in the first bottom plate 91 corresponding to the electronic component area 101, and the first sub-backlight module 10 and the second sub-backlight module 20 are both disposed in the accommodating space. The first bottom plate 91 of the first backplate 100 comprises a first support plate 911, an extension plate 912 extending from a side portion of the first support plate 911 in a direction away from the first support plate 911, and a second support plate 913 extending from a side portion of the extension plate 912 away from the first support plate 911 in a direction away from the extension plate 912. The second sub-backlight module 20 is installed in the accommodating space defined by the first backplate 100. The first sub-backlight module 10 is connected to the second sub-backlight module 20 and supported by the second support plate 913. Through the above configuration, the first support plate 911 supports the second sub-backlight module 20, and the second support plate 913 supports the first sub-backlight module 10. Since the first sub-backlight module 10 and the second sub-backlight module 20 are both disposed in the same one accommodating space, a first reflection sheet 13 of the first sub-backlight module 10 and a second reflection sheet 23 of the second sub-backlight module 20 are fixedly connected by a third adhesive layer 110.

Figure 3:
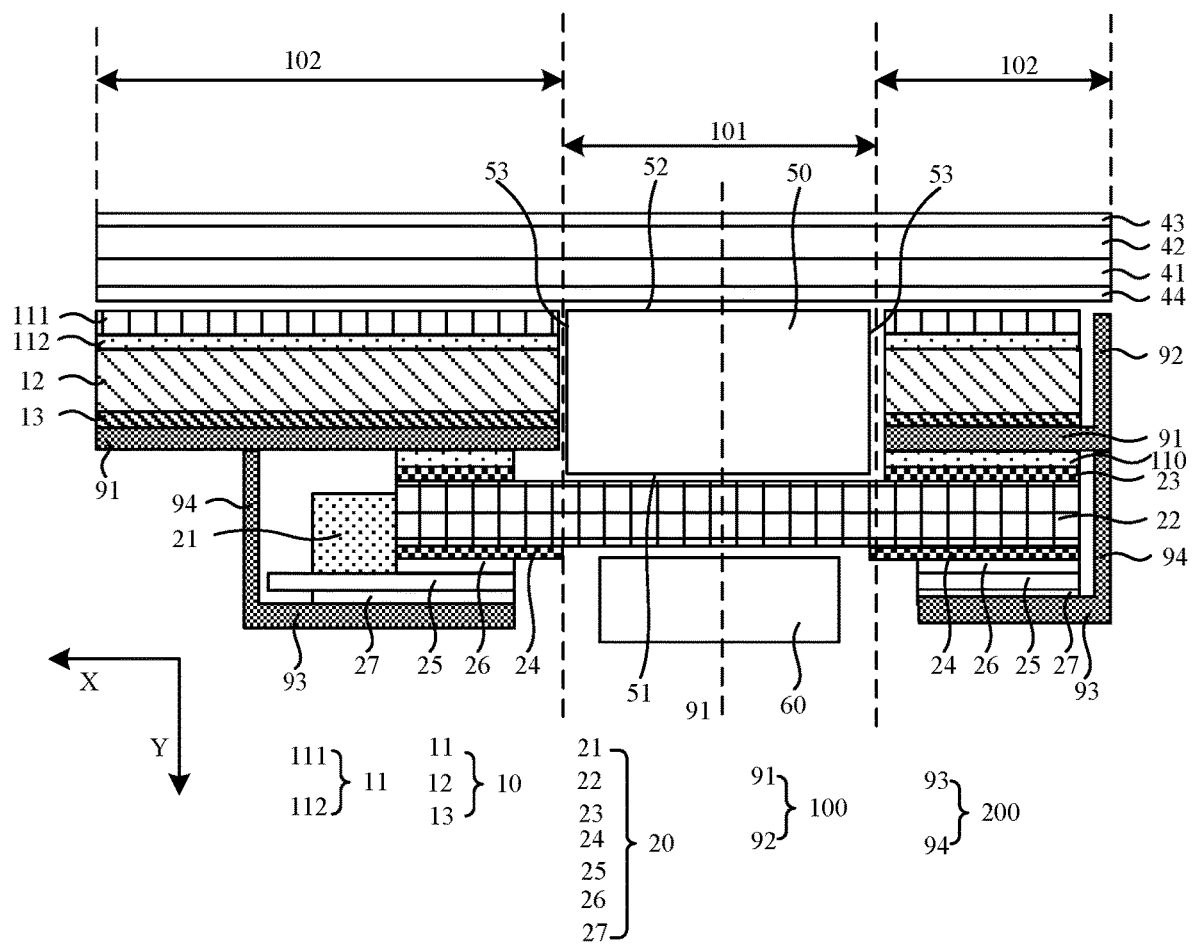
FIG. 3 is a second cross-sectional structural view, taken along the A-A direction in FIG. 1, illustrating a film structure of the display panel.

In one embodiment, as shown in FIG. 3, the backlight module comprises a first backplate 100 and a second backplate 200 sequentially arranged in the first direction Y, and the first backplate 100 comprises a first bottom plate 91 and a first side plate 92. The first bottom plate 91 and the first side plate 92 define an accommodating space, and the first sub-backlight module 10 is disposed in the accommodating space and connected to the first backplate 100. The second backplate 200 comprises a second bottom plate 93 and a second side plate 94. The second bottom plate 93 and the second side plate 94 define an accommodating space, and the second sub-backlight module 20 is disposed in the accommodating space and connected to one side of the first backplate 100 away from the first sub-backlight module 10 and to the second backplate 200. Specifically, the second sub-backlight module 20 is connected to the first bottom plate 91 of the first backplate 100 through a third adhesive layer 110. The first bottom plate 91 of the first backplate 100 and the second bottom plate 93 of the second backplate 200 both form a through hole corresponding to the electronic component area 101.

Figure 4:
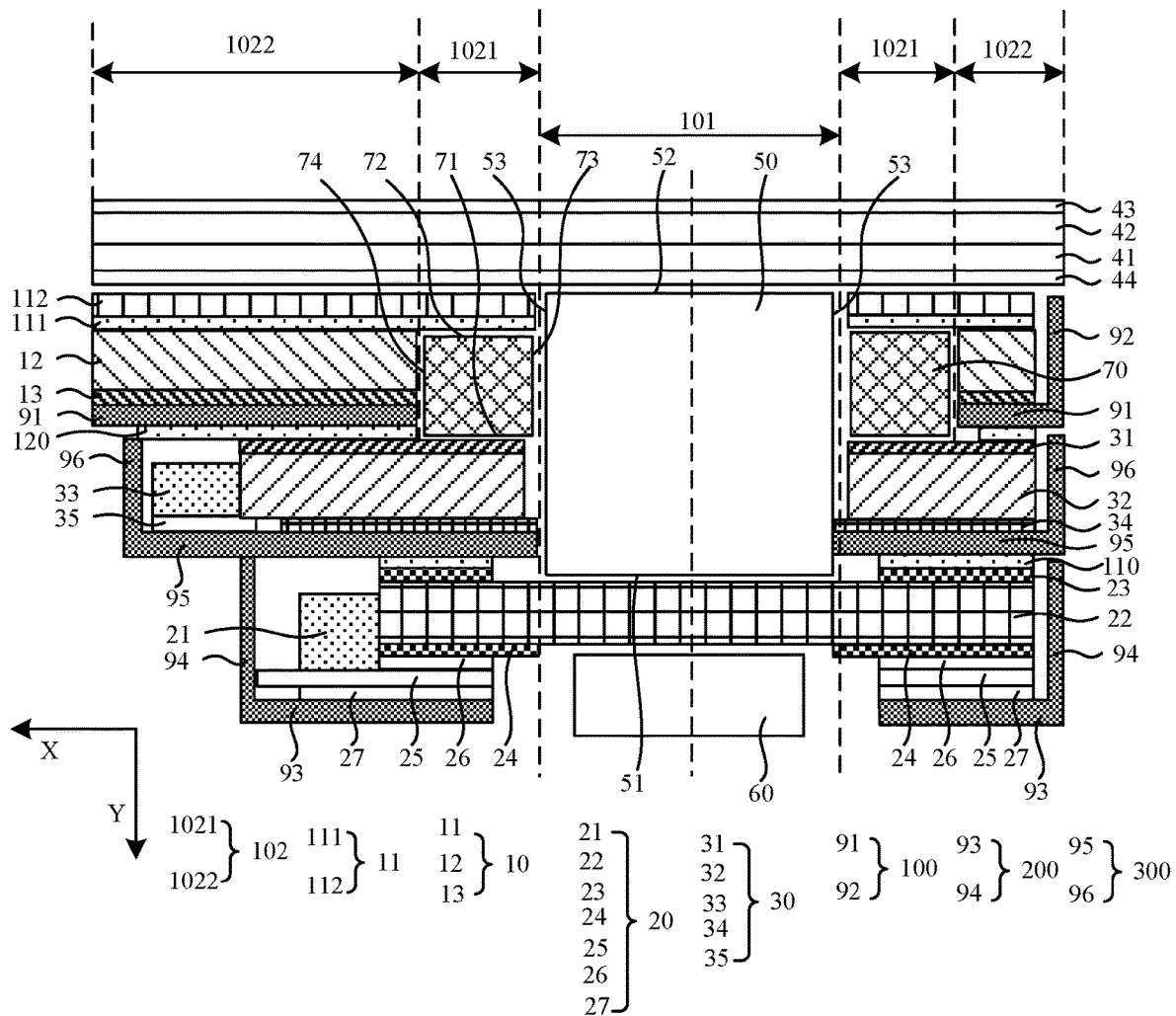
FIG. 4 is a third cross-sectional structural view, taken along the A-A direction in FIG. 1, illustrating the film structure of the display panel.

As shown in FIGS. 4 and 1, the display area 102 comprises a first display area 1021 surrounding the electronic component area 101 and a second display area 1022 surrounding the first display area 1021. The backlight module comprises a third sub-backlight module 30 between the first sub-backlight module 10 and the second sub-backlight module 20. In the first direction Y, the first sub-backlight module sequentially comprises the first optical film 11 and the first light guide plate 12. The third sub-backlight module 30 sequentially comprises a third optical film 31 and a third light guide plate 32. The first light guide plate 12 covers the second display area 1022 and forms an opening corresponding to the first display area 1021 and the electronic component area 101. The third optical film 31 and the third light guide plate 32 cover the first display area 1021 and form an opening corresponding to the electronic component area 101.

In the present embodiment, the backlight module further comprises the third sub-backlight module 30 arranged between the first sub-backlight module 10 and the second sub-backlight module 20. The third sub-backlight module 30 also comprises a third backlight source 33, a second flexible circuit board 35 electrically connected to the third backlight source 33, and a fourth reflective sheet 34 disposed under the third light guide plate 32. The third sub-backlight module 30 is also an edge-lit backlight structure. The third backlight source 33 is arranged on the side of the display panel and corresponding to a light incident surface of the third light guide plate 32. After entering the third light guide plate 32, light emerges from a light-emergent surface of the third light guide plate 32 to provide backlight to the display panel body in the first display area 1021, so that the first display area 1021 can display images. The light-emergent surface of the third light guide plate 32 is perpendicular to the first direction Y. In FIG. 4, an upper surface of the third light guide plate 32 close to the display panel body is the light-emergent surface of the third light guide plate 32.

The first light guide plate 12 covers the second display area 1022, and forms an opening corresponding to the first display area 1021 and the electronic component area 101. That is to say, the first light guide plate 12 is only arranged in the second display area 1022, and a shape and a size of the opening is same as a shape and a size of an entire area constituted by the first display area 1021 and the electronic component area 101. The third optical film 31 and the third light guide plate 32 can be only arranged in the first display area 1021, or alternatively, can be partially arranged in the first display area 1021 and partially arranged in the second display area 1022. No matter what kind of the arrangement, the third optical film 31 and the third light guide plate 32 must cover that the first display area 1021 to provide backlight for the first display area 1021. The third optical film 31 and the third light guide plate 32 both form an opening corresponding to the electronic component area 101. A shape and a size of the opening is same as a shape and a size of the electronic component area 101.

In one embodiment, a material of the third light guide plate 32 is polycarbon fiber.

In one embodiment, the display panel further comprises a second light-shielding member 70, the second light-shielding member 70 is located in the opening of the first light guide plate 12 and engaged outside the first light-shielding portion of the first light-shielding member 50. The second light-shielding member 70 comprises a second light-transmissive portion and a second light-shielding portion. The second light-transmitting portion comprises a second light-incident surface 71 and a second light-emergent surface 72 arranged opposite to each other and comprises an inner side surface 73 and a second outer side surface 74 connected to the second light-incident surface 71 and the second light-emergent surface 72. The second light-incident surface 71 is disposed corresponding to the light-emergent surface of the third light guide plate 32, the second light-emergent surface 72 is disposed corresponding to the light-incident surface of the display panel body. The inner side surface 73 is disposed close to the first light-shielding portion, the second outer side surface 74 is disposed away from the first light-shielding portion, and the second light-shielding portion covers at least one of the inner side surface 73 or the second outer side surface 74.

The first light-shielding member 50 is a solid cylindrical structure, and the second light-shielding member 70 is a hollow cylindrical structure sleeved outside the solid cylindrical structure. A bottom surface of the hollow cylindrical structure is the second light-incident surface 71, and a top surface of the hollow cylindrical structure is the second light-emergent surface 72. An inner side surface of the hollow cylindrical structure is the inner side surface 73, and an outer side surface of the hollow cylindrical structure is the second outer side surface 74. When light from the third backlight source 33 is emergent from the light-emergent surface of the third light guide plate 32, the emergent light enters the second light-transmissive portion from the second light-incident surface 71, and then is emitted out of the second light-transmissive portion from the second light-emergent surface 72 to provide backlight to the display panel body in the first display area 1021. The second light-shielding portion can cover only the inner side surface 73, or can cover only the second outer side surface 74, or can cover both the inner side surface 73 and the second outer side surface 74 at the same time. When both the inner side surface 73 and the second outer side surface 74 are covered at the same time, the light-shielding effect is better. When the third backlight source 33 emits light, the second light-shielding portion can prevent the light of the first display area 1021 from entering the electronic component area 101, thereby preventing light leakage.

By providing the first light-shielding member 50 and the second light-shielding member at the same time, there is double light-shielding in a horizontal direction. Therefore, the light-shielding effect is better than the light-shielding effect when the first light-shielding member 50 is solely used. Furthermore, since such configuration ensures better light-shielding effect, the display effect of the first display area 1021 is not affected by disposing the third sub-backlight module 30 in an area where the second light-shielding member 70 is located to provide backlight for the first display area 1021. Therefore, the present application realizes full-screen display while ensuring no light leakage.

When there are three sub-backlight modules, the first backlight source, the second backlight source 21 and the third backlight source 33 emit light when the display panel body displays images. When the electronic components are in operation, the first backlight source and the second backlight source 21 emit light, and the third backlight source 33 does not emit light.

In one embodiment, the first outer side surface 53 of the first light-shielding member 50 is in contact with an inner surface of the opening of the third light guide plate 32. The inner side surface 73 of the second light-shielding member 70 is in contact with the first outer side surface 53 of the first light-shielding member 50. The second outer side surface 74 of the second light-shielding member 70 is in contact with the inner surface of the opening of the first light guide plate 12.

The opening of the third light guide plate 32 is defined corresponding to the electronic component area 101. Therefore, when the first outer side surface 53 of the first light-shielding member 50 is in contact with the inner surface of the opening of the third light guide plate 32, it means that a diameter of the cylindrical-shaped first light-shielding member 50 is equal to a diameter of the electronic component area 101. Such configuration can prevent the first light-shielding member 50 from shaking/wobbling in the second direction X in the third opening to affect the light-shielding effect. That is to say, the third light guide plate 32 and the third optical film 31 restrain movement of the first light-shielding member 50 in the horizontal direction.

The inner side surface 73 of the second light-shielding member 70 is in contact with the first outer side surface 53 of the first light-shielding member 50. That is to say, the hollow cylindrical structure and the solid cylindrical structure are snugly engaged with each other, and their centers are in a same axis. The second opening is defined corresponding to an entire area constituted by the electronic component area 101 and the first display area 1021. Therefore, when the second outer surface 74 of the second light-shielding member 70 is in contact with the inner surface of the opening of the first light guide plate 12, it means an outer diameter of the hollow cylindrical-shaped second light-shielding member 70 is equal to a diameter of the entire area constituted by the electronic component area 101 and the first display area 1021. Such configuration prevents the second light-shielding member 70 from shaking/wobbling in the second direction X in the second opening to thereby affect the light-shielding effect. That is to say, the first light-shielding member 50 on an inner side and the first light guide plate 12 on an outer side can simultaneously restrain movement of the second light-shielding member 70.

In practical manufacturing processes, a certain gap can be reserved between any two of the above-mentioned components in contact with each other. By restraining movement in the horizontal direction as mentioned above, the first light-shielding member 50 can be stably installed in the opening of the third light guide plate 32 without resorting to other means, and the second light-shielding member 70 can be stably installed in the opening of the first light guide plate 12 without resorting to other means, while superior light-shielding effects are achieved.

In one embodiment, the second light-emergent surface 72 of the second light-shielding member 70 is in contact with one side of the first optical film 11 away from the display panel body. As shown in FIG. 4, the opening formed by the first optical film 11 is smaller than the opening formed by the first light guide plate 12. The opening formed by the first optical film 11 can be larger than or equal to the opening formed by the third optical film 31. Furthermore, a height of the second light-shielding member 70 is equal to a height between a lower surface of the first optical film 11 and an upper surface of the third optical film 31. Such configuration prevents the second light-shielding member 70 from wobbling in the second opening in the first direction Y to thereby affect light transmission. That is to say, the first optical film 11 and the third optical film 31 restrain movement of the second light-shielding member 70 in the vertical direction. In practical manufacturing processes, a gap of no more than 0.02 mm can be reserved between two components.

Figure 5:
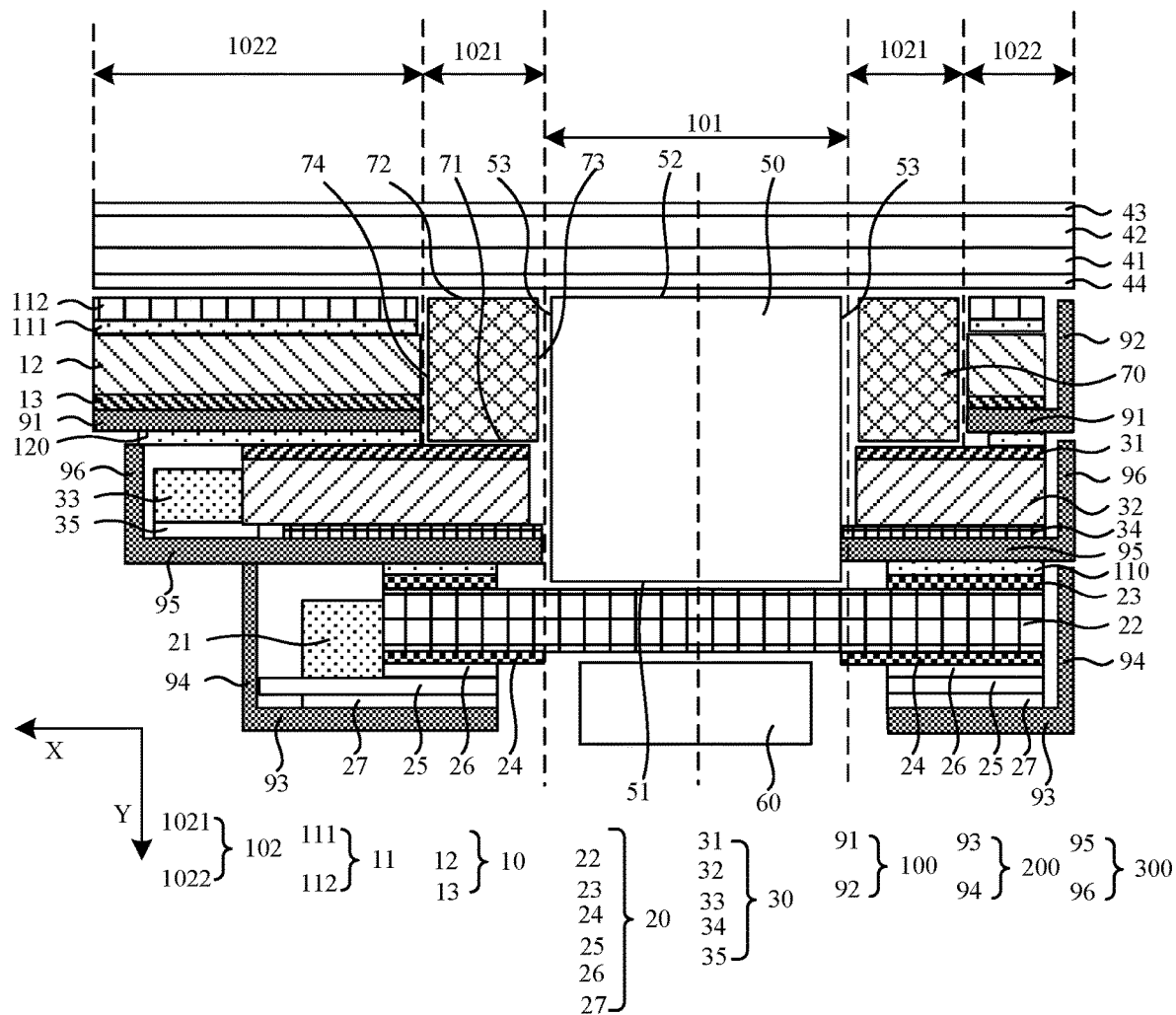
FIG. 5 is a fourth cross-sectional structural view, taken along the A-A direction in FIG. 1, illustrating the film structure of the display panel.

In one embodiment, the second light-emergent surface 72 of the second light-shielding member 70 is in contact with the light-incident surface of the display panel body. As shown in FIG. 5, the two openings formed by the first optical film 11 and the first light guide plate 12 have a same size, so the height of the second light-shielding member 70 is equal to the height between the lower surface of the display panel body and the upper surface of the third optical film 31. Such configuration can also prevent the second light-shielding member 70 from shaking/wobbling in the second opening in the first direction Y to thereby affect the light transmission. That is to say, the display panel body and the third optical film 31 restrain movement of the second light-shielding member 70 in the vertical direction. In practical manufacturing processes, a gap of no more than 0.02 mm can be reserved between two components.

In one embodiment, as shown in FIGS. 4 and 5, the backlight module comprises a first backplate 100, a third backplate 300, and a second backplate 200 that are sequentially arranged in the first direction Y. First to third sub-backlight modules 10, 20, 30 are installed on the first to third backplates 100, 200, 300. The third sub-backlight module 30 is connected between the first backplate 100 and the third backplate 300. The second sub-backlight module 20 is connected between the third backplate 300 and the second backplate 200. The first backplate 100 comprises a first bottom plate 91 and a first side plate 92. The first bottom plate 91 and the first side plate 92 form an accommodating space. The first sub-backlight module 10 is located in the accommodating space and is installed on the first backplate 100. The third backplate 300 comprises a third bottom plate 95 and a third side plate 96. The third bottom plate 95 and the third side plate 96 form an accommodating space where the third sub-backlight module 30 is located. The third sub-backlight module 30 is connected to one side of the first backplate 100 away from the first sub-backlight module 10 and to the third backplate 300. Specifically, the third sub-backlight module 30 is connected to the first bottom plate 91 of the first backplate 100 through a fourth adhesive layer 120. The second backplate 200 comprises a second bottom plate 93 and a second side plate 94. The second bottom plate 93 and the second side plate 94 form an accommodating space where the second sub-backlight module 20 is located. The second sub-backlight module 20 is connected to one side of the third backplate 300 away from the third sub-backlight module 30 and to the second backplate 200. Specifically, the second sub-backlight module 20 is connected to the third bottom plate 95 of the third backplate 300 through a third adhesive layer 110. The first bottom plate 91 of the first backplate 100 forms a through hole corresponding to the electronic component area 101 and the first display area 1021, and the second bottom plate 93 of the second backplate 200 and the third bottom plate 95 of the third backplate 300 both form a through hole corresponding to the electronic component area 101.

Figure 6:
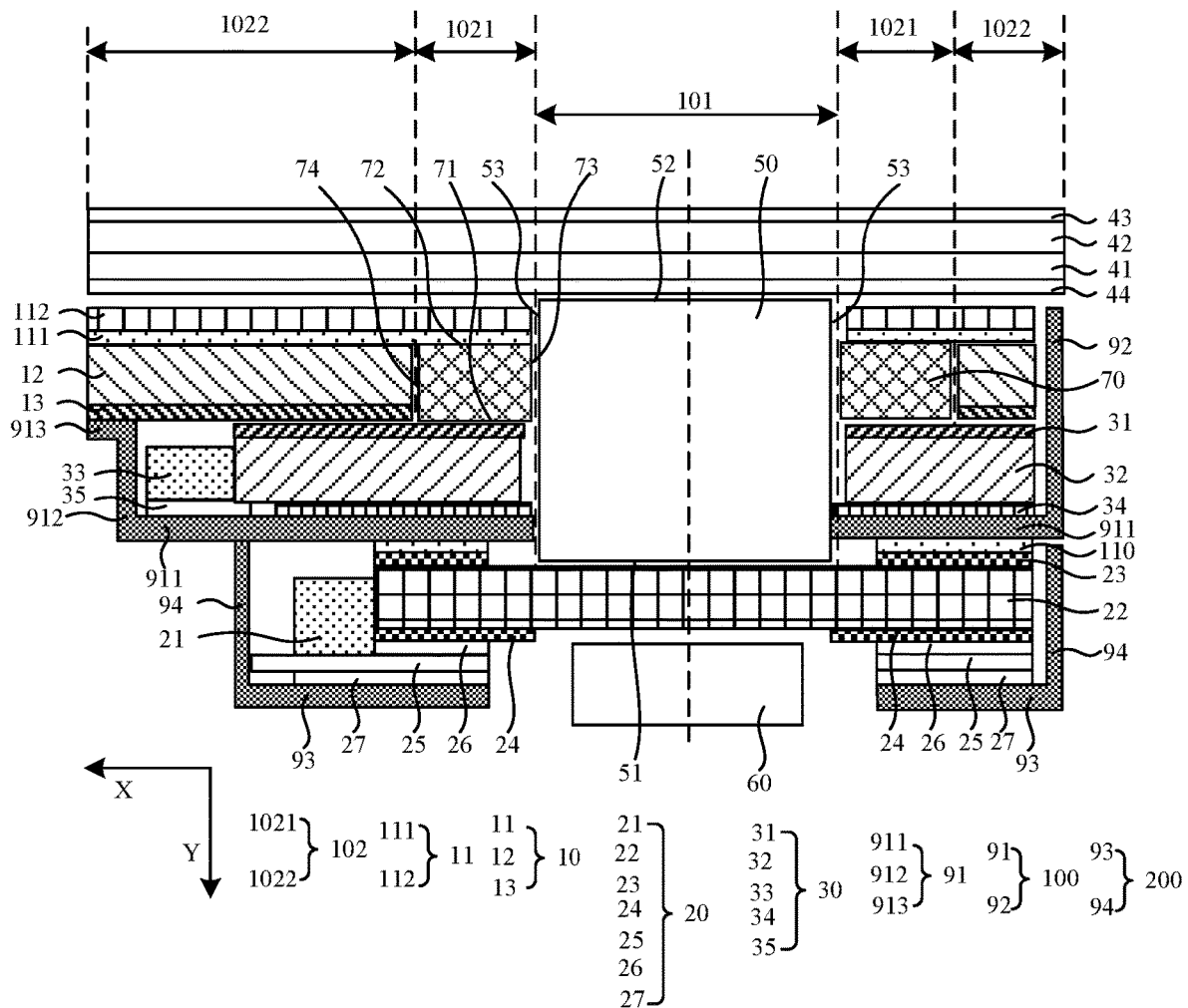
FIG. 6 is a fifth cross-sectional structural view, taken along the A-A direction in FIG. 1, illustrating the film structure of the display panel.
Figure 7:
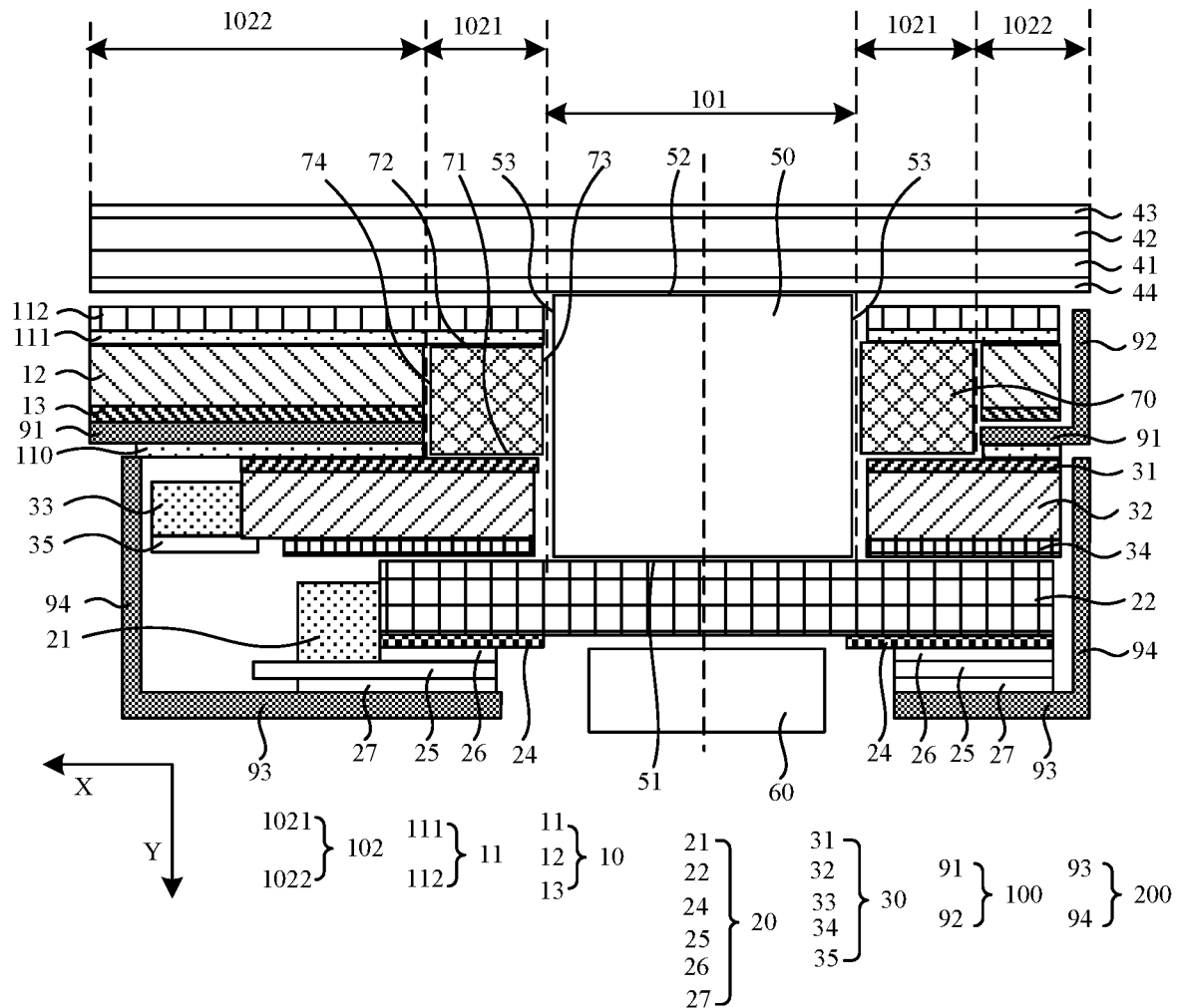
FIG. 7 is a sixth cross-sectional structural view, taken along the A-A direction in FIG. 1, illustrating the film structure of the display panel.

In one embodiment, as shown in FIGS. 6 and 7, the backlight module comprises a first backplate 100 and a second backplate 200 sequentially arranged in the first direction Y. Adjacent two of first to third sub-backlight modules 10, 20, 30 are installed on one of the first backplate 100 and the second backplate 200, and the remaining one of the first to third sub-backlight modules 10, 20, 30 is installed on the other one of the first backplate 100 and the second backplate 200.

FIG. 6 shows one arrangement. The first backplate 100 in FIG. 6 comprises a first bottom plate 91 and a first side plate 92. The first bottom plate 91 and the first side plate 92 form an accommodating space, and the first sub-backlight module 10 and the third sub-backlight module 30 are arranged in the accommodating space. Further, the first bottom plate 91 of the first back plate 100 comprises a first support plate 911, an extension plate 912 extending from a side portion of the first support plate 911 in a direction away from the first support plate 911, and a second support plate 913 extending from a side portion of the extension plate 912 away from the first support plate 911 in a direction away from the extension plate 912. The third sub-backlight module 30 is installed in the accommodating space defined by the extension plate 912 and the first support plate 911. The first sub-backlight module 10 is connected to the third sub-backlight module 30 and supported on the second support plate 913. Through the above configuration, the first support plate 911 supports the third sub-backlight module 30, and the second support plate 913 supports the first sub-backlight module 10. The second backplate 200 comprises a second bottom plate 93 and a second side plate 94. The second bottom plate 93 and the second side plate 94 define an accommodating space where the second sub-backlight module is located. The second sub-backlight module 20 is connected to one side of the first backplate 100 away from the first sub-backlight module 10 and is connected to the second back plate 200. Specifically, the second sub-backlight module 20 is connected to the first bottom plate 91 of the first backplate 100 through the third adhesive layer 110. The first bottom plate 91 of the first backplate 100 and the second bottom plate 93 of the second backplate 200 both form a through hole corresponding to the electronic component area 101.

FIG. 7 shows another arrangement. In FIG. 7, the first backplate 100 comprises a first bottom plate 91 and a first side plate 92. The first bottom plate 91 and the first side plate 92 define an accommodating space where the first sub-backlight module 10 is located. The first sub-backlight module 10 is connected to the first back plate 100. The second backplate 200 comprises a second bottom plate 93 and a second side plate 94. The second bottom plate 93 and the second side plate 94 define an accommodating space where the third sub-backlight module and the second sub-backlight module 20 are both located. The second sub-backlight module is installed on the second backplate 200, and the third sub-backlight module 30 is connected to one side of the first backplate 100 away from the first sub-backlight module 10. Specifically, the third sub-backlight module 30 is connected to the first bottom plate 91 of the first backplate 100 through a third adhesive layer 110. Moreover, a fourth reflection sheet 34 under the third light guide plate 32 can reflect light for the third light guide plate 32 and the second light guide plate 22 at the same time, and there is no need to provide an additional reflection sheet above the second light guide plate 22. The first bottom plate 91 of the first backplate 100 forms a through hole corresponding to the electronic component area 101 and the first display area 1021. The second bottom plate 93 of the second backplate 200 forms a through hole corresponding to the electronic component area 101.

Figure 8:
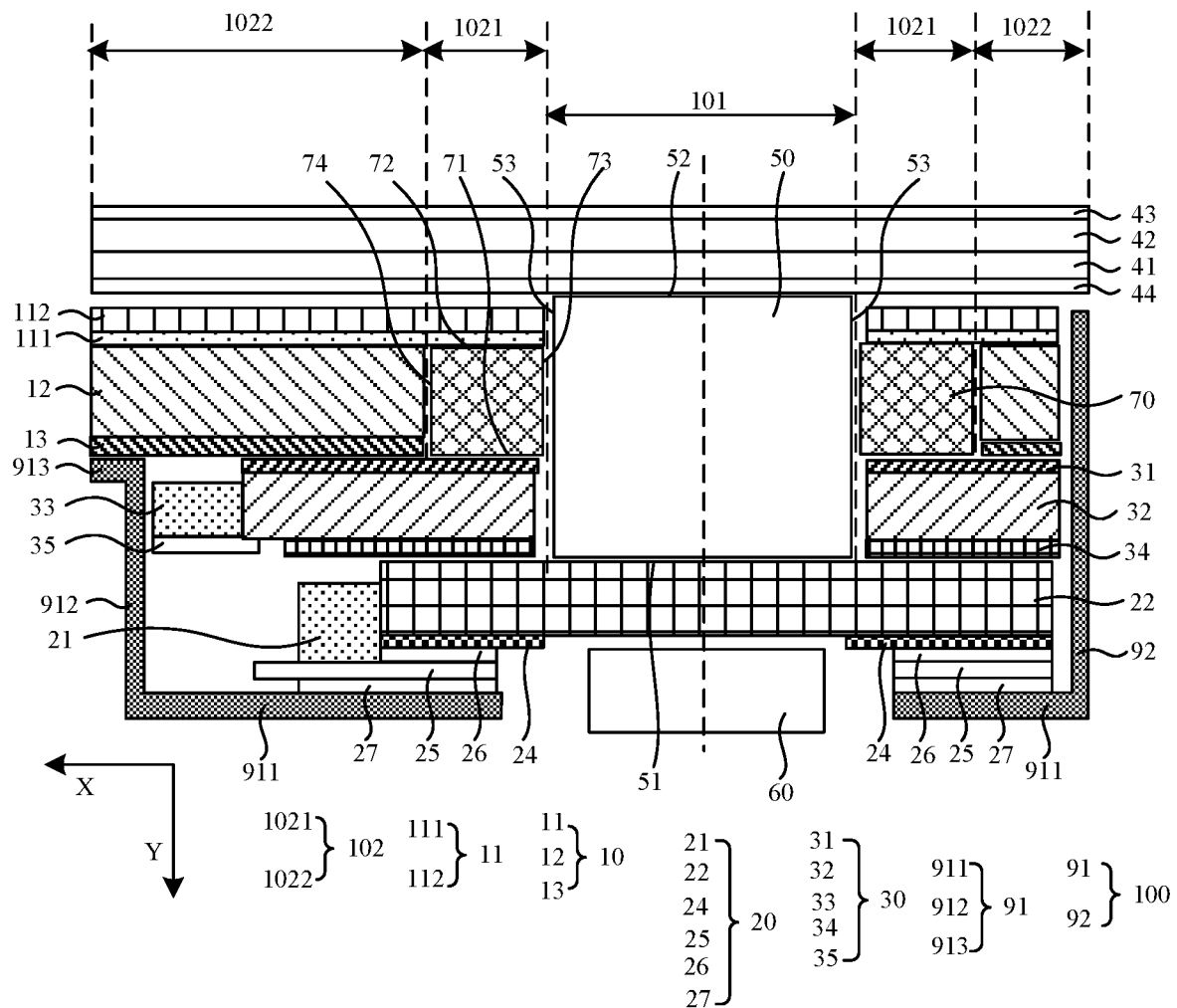
FIG. 8 is a seventh cross-sectional structural view, taken along the A-A direction in FIG. 1, illustrating the film structure of the display panel.

In one embodiment, as shown in FIG. 8, the backlight module only comprises a first backplate 100, and the first backplate 100 comprises a first bottom plate 91 and a first side plate 92. The first bottom plate 91 and the first side plate 92 defines an accommodating space, and the first sub-backlight module 10, the second sub-backlight module 20, and the third sub-backlight module 30 are all disposed in the accommodating space. The first bottom plate 91 of the first back plate 100 comprises a first support plate 911, an extension plate 912 extending from a side portion of the first support plate 911 in a direction away from the first support plate 911, and a second support plate 913 extending from a side portion of the extension plate 912 away from the first support plate 911 in a direction away from the extension plate 912. The second sub-backlight module 20 and the third sub-backlight module 30 are disposed in the accommodating space defined by the first support plate 911 and the extension plate 912. The second sub-backlight module 20 is installed on the first backplate 100, the third sub-backlight module 30 is connected to the second sub-backlight module 20, and the first sub-backlight module 10 is connected to the second sub-backlight module 20 and supported by the second support plate 913. Through the above configuration, the first support plate 911 supports the second sub-backlight module 20 and the third sub-backlight module 30, and the second support plate 913 supports the first sub-backlight module 10.

It can be known from the above-mentioned embodiments that each sub-backlight module in the present application can be an independent structure or a one-piece formed structure. Those skilled in the art can decide the number of backplates and the arrangements for the sub-backlight modules according to actual needs.

In the above-mentioned embodiment, whether it includes only the first sub-backlight module 10 and the second sub-backlight module 20, or it includes the first sub-backlight module the second sub-backlight module 20, and the third sub-backlight module 30 at the same time. Any adjacent two of the light guide plates have an overlapped portion. In addition to covering an area for illumination, each light guide plate can also extend partly to other areas, so that any adjacent two light guide plates have the overlapped portion. The overlapped portion can cover a boundary line between two adjacent areas, thus preventing light leakage at a boundary between two different areas. In other words, such an arrangement can better prevent light leakage.

In the above embodiments, the first display area 1021 and the electronic component area 101 are both circular, and their centers are arranged in a same axis. When each film layer or structure in the backlight module forms an opening, each opening is also circular, and each center is also on a same axis.

In the above-mentioned embodiment, for convenience of illustration, the display area 102 on a left side of the electronic component area 101 in FIGS. 2-8 is not shown but does exist.

In the above embodiments, the display panel further comprises a control unit. When the display panel body is displaying images, the control unit is configured to control the second backlight source 21 to emit light and control the second light guide plate 22 to be in the light-scattering state to transmit the light from the second backlight source 21 to the display panel body. When the electronic component 60 is in operation, the control unit controls the second backlight source 21 not to emit light, and also controls the second light guide plate 22 to be in the transparent state to transmit the ambient light to the electronic components 60. The control unit can be a component in a driver chip electrically connected to the second sub-backlight module 20. Under the control of the control unit, the display panel body in this area can both display images and take photos/videos, thus realizing full-screen display.

In the above embodiments, materials of the first light-transmissive portion and the second light-transmissive portion are both highly light-transmissive materials, such as at least one of glass, polycarbon fiber, or polymethyl methacrylate. At least one of the first light-incident surface 51, the second light-incident surface 71, the first light-emergent surface 52, or the second light-emergent surface 72 is a glossy surface structure, which is made by a polishing process to enhance light transmittance. The first light-shielding portion and the second light-shielding portion are both metal materials, and specifically can be vacuum silver plating.

The present application further provides an electronic device. The electronic device comprises the display panel in any of the above embodiments. The electronic device can be a device with display functions, such as a smart watch, a tablet computer, a notebook computer, a personal computer (PC), and a miniature processing box. The equipment can realize full-screen display without leaking.

IN SUMMARY

The present application provides the display panel and the electronic device. The display panel comprises the electronic component area and the display area surrounding the electronic component area. The first sub-backlight module is disposed corresponding to the display area, and the second sub-backlight module is disposed corresponding to the electronic component area. Since the light guide plate of the second sub-backlight module can be switched between the light-scattering state and the transparent state, the display panel body in the electronic component area can display images and take photos/videos through the light of the backlight source or the ambient light. Furthermore, the first light-shielding member is arranged in the accommodating space defined by the display panel body and the backlight module. As a result, the present application not only can allow transmission of the ambient light or the light of the backlight source, but also prevent the light of the first sub-backlight module from entering the electronic component area to avoid light leakage during shooting. Therefore, the display panel of the present application realizes full-screen display while ensuring no light leakage.

In the above-mentioned embodiments, the description of each embodiment has its own emphasis. For those that are not described in detail in one embodiment, reference can be made to related descriptions of other embodiments.

The display panel and the electronic device of the present application are described in detail as above. Specific examples are used in the present disclosure to illustrate working principles and embodiments of the present application. The descriptions of the above embodiments are only used for ease of understanding the technical solutions and main ideas of the present application. Those of ordinary skill in the art can still modify the technical solutions or equivalently replace some of the technical features in the foregoing embodiments. Technical solutions with all such modifications or replacements should be deemed to fall within the protection scope of the present application.

What is claimed is:

1. A display panel, comprising an electronic component area and a display area surrounding the electronic component area, wherein the display panel further comprises:
   a display panel body;
   a backlight module arranged on one side of the display panel body, wherein the backlight module sequentially comprises a first sub-backlight module and a second sub-backlight module in a first direction away from the display panel body, the first sub-backlight module is arranged corresponding to the display area, the second sub-backlight module covers the electronic component area, the second sub-backlight module comprises a second backlight source and a second light guide plate, and the second light guide plate comprises a transparent state and a light-scattering state and is configured to be switched between the transparent state and the light-scattering state; and
   a first light-shielding member arranged in an accommodating space enclosed by the display panel body, the first sub-backlight module, and the second sub-backlight module, wherein the first light-shielding member comprises a first light-transmissive portion and a first light-shielding portion; the first light-transmissive portion comprises a first light-incident surface, a first light-emergent surface arranged opposite to the first light-incident surface, and a first outer side surface connecting the first light-incident surface and the first light-emergent surface; the first light-incident surface is arranged corresponding to a light-emergent surface of the second light guide plate; the first light-emergent surface is arranged corresponding to a light-incident surface of the display panel body; and the first light-shielding portion covers the first outer side surface.

2. The display panel according to claim 1, wherein the display area comprises a first display area surrounding the electronic component area and a second display area surrounding the first display area; the backlight module further comprises a third sub-backlight module arranged between the first sub-backlight module and the second sub-backlight module; the first sub-backlight module comprises a first light guide plate, and the third sub-backlight module comprises a third light guide plate; and the first light guide plate covers the second display area and comprises an opening defined corresponding to the first display area and the electronic component area, and the third light guide plate covers the first display area and comprises an opening defined corresponding to the electronic component area.

3. The display panel according to claim 2, wherein any adjacent two of the first light guide plate, the second light guide plate, and the third light guide plate have an overlapped portion.

4. The display panel according to claim 2, wherein the display panel further comprises a second light-shielding member, the second light-shielding member is located in the opening of the first light guide plate and engaged outside the first light-shielding portion; the second light-shielding member comprises a second light-transmissive portion and a second light-shielding portion; the second light-transmissive portion comprises a second light-incident surface, a second light-emergent surface arranged opposite to the second light-incident surface, and an inner side surface and a second outer side surface connected to the second light-incident surface and the second light-emergent surface; the second light-incident surface is arranged corresponding to the light-emergent surface of the third light guide plate, and the second light-emergent surface is arranged corresponding to the light-incident surface of the display panel body; the inner side surface is disposed close to the first light-shielding portion, and the second outer side surface is disposed away from the first light-shielding portion; and the second light-shielding portion covers at least one of the inner side surface or the second outer side surface.

5. The display panel according to claim 2, wherein the backlight module comprises a first backplate, a third backplate, and a second backplate sequentially arranged in the first direction; the first to the third sub-backlight modules are installed on the first to the third backplates, respectively; the third sub-backlight module is connected between the first backplate and the third backplate; and the second sub-backlight module is connected between the third backplate and the second backplate.

6. The display panel according to claim 2, wherein the backlight module comprises a first backplate and a second backplate sequentially arranged in the first direction, adjacent two of the first to the third sub-backlight modules are installed on one of the first backplate and the second backplate, and the remaining one of the first to the third sub-backlight modules is installed on the other one of the first backplate and the second backplate.

7. The display panel according to claim 6, wherein the first sub-backlight module is installed on the first backplate, the second sub-backlight module is installed in an accommodating space of the second backplate, and the third sub-backlight module is located in the accommodating space of the second backplate and connected to one side of the first backplate away from the first sub-backlight module.

8. The display panel according to claim 6, wherein the third sub-backlight module is installed on the first backplate, the first sub-backlight module is installed in an accommodating space of the first backplate, and the second sub-backlight module is installed in an accommodating space of the second backplate and connected to one side of the first backplate away from the third sub-backlight module.

9. The display panel according to claim 1, wherein the second light guide plate comprises a first electrode, a second electrode, and a polymer-dispersed liquid crystal layer disposed between the first electrode and the second electrode.

10. The display panel according to claim 4, wherein the display panel further comprises a control unit and a plurality of electronic components; the electronic components are arranged on one side of the second sub-backlight module away from the display panel body and located in the electronic component area; when the display panel body displays images, the control unit is configured to control the second backlight source to emit light, and to control the second light guide plate to be in the light-scattering state to transmit light from the second backlight source to the display panel body; and when the electronic components are in operation, the control unit is configured to control the second backlight source not to emit light, and to control the second light guide plate to be in the transparent state to transmit ambient light to the electronic components.

11. An electronic device, comprising a display panel with an electronic component area and a display area surrounding the electronic component area, wherein the display panel comprises:
a display panel body;
a backlight module arranged on one side of the display panel body, wherein the backlight module sequentially comprises a first sub-backlight module and a second sub-backlight module in a first direction away from the display panel body, the first sub-backlight module is arranged corresponding to the display area, the second sub-backlight module covers the electronic component area, the second sub-backlight module comprises a second backlight source and a second light guide plate, and the second light guide plate comprises a transparent state and a light-scattering state and is configured to be switched between the transparent state and the light-scattering state; and
a first light-shielding member arranged in an accommodating space enclosed by the display panel body, the first sub-backlight module, and the second sub-backlight module, wherein the first light-shielding member comprises a first light-transmissive portion and a first light-shielding portion; the first light-transmissive portion comprises a first light-incident surface, a first light-emergent surface arranged opposite to the first light-incident surface, and a first outer side surface connecting the first light-incident surface and the first light-emergent surface; the first light-incident surface is arranged corresponding to a light-emergent surface of the second light guide plate; the first light-emergent surface is arranged corresponding to a light-incident surface of the display panel body; and the first light-shielding portion covers the first outer side surface.

12. The electronic device according to claim 11, wherein the display area comprises a first display area surrounding the electronic component area and a second display area surrounding the first display area; the backlight module further comprises a third sub-backlight module arranged between the first sub-backlight module and the second sub-backlight module; the first sub-backlight module comprises a first light guide plate, and the third sub-backlight module comprises a third light guide plate; and the first light guide plate covers the second display area and comprises an opening defined corresponding to the first display area and the electronic component area, and the third light guide plate covers the first display area and comprises an opening defined corresponding to the electronic component area.

13. The electronic device according to claim 12, wherein any adjacent two of the first light guide plate, the second light guide plate, and the third light guide plate have an overlapped portion.

14. The electronic device according to claim 12, wherein the display panel further comprises a second light-shielding member, the second light-shielding member is located in the opening of the first light guide plate and engaged outside the first light-shielding portion; the second light-shielding member comprises a second light-transmissive portion and a second light-shielding portion; the second light-transmissive portion comprises a second light-incident surface, a second light-emergent surface arranged opposite to the second light-incident surface, and an inner side surface and a second outer side surface connected to the second light-incident surface and the second light-emergent surface; the second light-incident surface is arranged corresponding to the light-emergent surface of the third light guide plate, and the second light-emergent surface is arranged corresponding to the light-incident surface of the display panel body; the inner side surface is disposed close to the first light-shielding portion, and the second outer side surface is disposed away from the first light-shielding portion; and the second light-shielding portion covers at least one of the inner side surface or the second outer side surface.

15. The electronic device according to claim 12, wherein the backlight module comprises a first backplate, a third backplate, and a second backplate sequentially arranged in the first direction; the first to the third sub-backlight modules are installed on the first to the third backplates, respectively; the third sub-backlight module is connected between the first backplate and the third backplate; and the second sub-backlight module is connected between the third backplate and the second backplate.

16. The electronic device according to claim 12, wherein the backlight module comprises a first backplate and a second backplate sequentially arranged in the first direction, adjacent two of the first to the third sub-backlight modules are installed on one of the first backplate and the second backplate, and the remaining one of the first to the third sub-backlight modules is installed on the other one of the first backplate and the second backplate.

17. The electronic device according to claim 16, wherein the first sub-backlight module is installed on the first backplate, the second sub-backlight module is installed in an accommodating space of the second backplate, and the third sub-backlight module is located in the accommodating space of the second backplate and connected to one side of the first backplate away from the first sub-backlight module.

18. The electronic device according to claim 16, wherein the third sub-backlight module is installed on the first backplate, the first sub-backlight module is installed in an accommodating space of the first backplate, and the second sub-backlight module is installed in the accommodating space of the second backplate and connected to one side of the first backplate away from the third sub-backlight module.

19. The electronic device according to claim 11, wherein the second light guide plate comprises a first electrode, a second electrode, and a polymer-dispersed liquid crystal layer disposed between the first electrode and the second electrode.

20. The electronic device according to claim 14, wherein the display panel further comprises a control unit and a plurality of electronic components; the electronic components are arranged on one side of the second sub-backlight module away from the display panel body and located in the electronic component area; when the display panel body displays images, the control unit is configured to control the second backlight source to emit light, and to control the second light guide plate to be in the light-scattering state to transmit light from the second backlight source to the display panel body; and when the electronic components are in operation, the control unit is configured to control the second backlight source not to emit light, and to control the second light guide plate to be in the transparent state to transmit ambient light to the electronic components.

* * * * *